United States Patent
Toyama et al.

(10) Patent No.: US 11,505,681 B2
(45) Date of Patent: Nov. 22, 2022

(54) CELLULOSE RESIN COMPOSITION, MOLDED BODY AND PRODUCT USING SAME

(71) Applicant: NEC CORPORATION, Tokyo (JP)

(72) Inventors: Kiyohiko Toyama, Tokyo (JP); Mina Shimizu, Tokyo (JP); Masatoshi Iji, Tokyo (JP); Midori Shimura, Tokyo (JP); Shukichi Tanaka, Tokyo (JP); Toshie Miyamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/772,580

(22) PCT Filed: Dec. 17, 2018

(86) PCT No.: PCT/JP2018/046431
§ 371 (c)(1),
(2) Date: Jun. 12, 2020

(87) PCT Pub. No.: WO2019/117316
PCT Pub. Date: Jun. 20, 2019

(65) Prior Publication Data
US 2020/0385548 A1 Dec. 10, 2020

(30) Foreign Application Priority Data

Dec. 15, 2017 (JP) .............................. JP2017-241068
Apr. 27, 2018 (JP) .............................. JP2018-087095

(51) Int. Cl.
| C08L 1/10 | (2006.01) |
| C08K 3/04 | (2006.01) |
| C08K 5/098 | (2006.01) |

(52) U.S. Cl.
CPC ...... *C08L 1/10* (2013.01); *C08K 3/04* (2013.01); *C08K 5/098* (2013.01)

(58) Field of Classification Search
CPC ...................................... C08L 1/10; C08L 1/12
See application file for complete search history.

(56) References Cited

U.S. PATENT DOCUMENTS

| 2013/0030084 A1 | 1/2013 | Kawashima et al. |
| 2013/0085213 A1 | 4/2013 | Imanishi et al. |
| 2015/0368442 A1 | 12/2015 | Soyama et al. |

FOREIGN PATENT DOCUMENTS

| JP | 07-017761 A | 1/1995 |
| JP | 2005-132970 A | 5/2005 |
| JP | 2009-073102 A | 4/2009 |
| JP | 2010-121121 A | 6/2010 |
| JP | 4524820 B2 | 8/2010 |
| JP | 2011-132453 A | 7/2011 |
| JP | 4766796 B2 | 9/2011 |
| JP | 2011-201961 A | 10/2011 |
| JP | 2011-225786 A | 11/2011 |
| JP | 2011-241236 A | 12/2011 |
| JP | 2012-198529 A | 10/2012 |
| JP | 2013-112781 A | 6/2013 |
| JP | 2015-063615 A | 4/2015 |
| JP | 2015-172150 A | 10/2015 |
| JP | 2017-502152 A | 1/2017 |
| JP | 2018-021103 A | 2/2018 |
| JP | 2018-024781 A | 2/2018 |
| WO | 2013/147143 A1 | 10/2013 |
| WO | 2014/119657 A1 | 8/2014 |

OTHER PUBLICATIONS

English Machine Translation JP2011132453 (A) obtained https://worldwide.espacenet.com/publicationDetails/claims?CC=JP&NR=2011132453A&KC=A&FT=D&ND=3&date=20110707&DB=EPODOC&locale=en_EP# (Year: 2011).*
International Search Report for PCT/JP2018/046431 dated Mar. 5, 2019 [PCT/ISA/210].
Extended European Search Report for EP Application No. 18889911.6 dated Jan. 25, 2021.
Japanese Office Communication for JP Application No. 2019-559241 dated Oct. 5, 2021 with English Translation.

* cited by examiner

*Primary Examiner* — Arrie L Reuther
(74) *Attorney, Agent, or Firm* — Sughrue Mion, PLLC

(57) ABSTRACT

A cellulose resin composition comprising a cellulose derivative and a lubricant, wherein the cellulose derivative is an acylated cellulose obtained by substituting at least a part of hydrogen atoms of hydroxy groups of a cellulose with an acyl group having 2 to 4 carbon atoms, and the content of the lubricant is in the range of 0.1 to 10% by mass. A cellulose resin composition capable of forming a molded body having a high-quality appearance and scratch resistance is provided.

41 Claims, No Drawings

CELLULOSE RESIN COMPOSITION, MOLDED BODY AND PRODUCT USING SAME

CROSS REFERENCE TO RELATED APPLICATIONS

This application is a National Stage of International Application No. PCT/JP2018/046431 filed Dec. 17, 2018, claiming priority based on Japanese Patent Application No. 2017-241068 filed Dec. 15, 2017 and Japanese Patent Application No. 2018-087095 filed Apr. 27, 2018, the entire contents of which are incorporated herein by reference.

TECHNICAL FIELD

The present invention relates to a cellulose resin composition, a molded body formed of the resin composition, and a product using the molded body.

BACKGROUND ART

Bioplastics made from vegetable law materials can contribute to countermeasures against petroleum depletion and global warming, and has been started being used in general products such as packaging, containers and fibers but also in durable products such as electronic equipment and automobiles.

However, conventional bioplastics, such as polylactic acid, polyhydroxyalkanates, modified starch, are all made of starch-based materials, i.e., edible parts. Therefore, in view of concerns about food shortages in the future, the development of new bioplastics using non-edible parts as raw materials is required.

As a raw material of the non-edible part, cellulose, which is a main component of wood and vegetation, is typical, and various bioplastics using the cellulose have been developed and commercialized.

Patent Literature 1 discloses a resin composition containing a cellulose derivative having groups formed by substituting hydrogen atoms of hydroxyl groups included in a cellulose with a hydrocarbon group and an acyl group, and a lubricant. The literature discloses that a molded body formed of this composition is excellent in thermoplasticity, moldability, impact resistance, and the like.

Patent Literature 2 discloses a cellulose derivative obtained by substituting at least a part of hydrogen atoms of hydroxyl groups included in cellulose with short-chain acyl groups and long-chain acyl groups. The literature discloses that a molded body formed of the composition containing this cellulose derivative is excellent in thermoplasticity, moldability, impact resistance, and the like, and that the cellulose derivative has a low water absorption coefficient and is excellent in thermoplasticity, strength, fracture elongation, and formability.

On another front, it has been recently desired to develop a resin molding having high external-appearance quality without coating. If a resin molding is not coated, cost for discharging volatile organic compounds (VOC) during a production process and coating cost can be saved. As for the molding obtained, a negative change in appearance caused by removal and degradation of coating can be overcome.

For example, Patent Literature 3 describes a thermoplastic resin composition containing a graft copolymer formed of a rubber polymer, a copolymer formed of a predetermined vinyl monomer, a predetermined polyester, and carbon black and/or a dye serving as a colorant in a predetermined ratio. The literature also states that an injection molding obtained by injection-molding the composition has high impact resistance and high external-appearance quality (glossy and jet-black color).

Patent Literature 4 describes a black resin composition containing a predetermined copolymerized polycarbonate resin, a colorant (carbon black and/or black organic dye) and a hindered amine based stabilizer and having specific properties (pencil hardness, low-temperature impact resistance, brittle fracture rate, glossiness, brightness). The literature also states that the black molding of the black resin composition has an excellent jet-black color and excellent low-temperature impact resistance, weather resistance, abrasion-resistance and heat-resistance.

Patent Literature 5 describes a black resin composition containing a predetermined copolymerized polycarbonate resin, a styrene resin, an impact modifier (rubber-modified resin) and carbon black in a predetermined blending ratio. The literature also states that a molding of the black resin composition has excellent jet-black color and excellent impact resistance, flowability, abrasion-resistance and heat-resistance.

Patent Literature 6 describes a thermoplastic resin composition containing a predetermined graft copolymer (1 to 99 parts by mass), a vinyl copolymer (99 to 1 part by mass), and other thermoplastic resins (0 to 80 parts by mass) and also containing a predetermined organic dye. The literature also states that a molded body of the composition is excellent in impact resistance, weather resistance, jet-black color, surface smoothness and abrasion-resistance. The literature also states that the thermoplastic resin composition of Comparative Example 3, which contains a pigment (carbon black: Mitsubishi carbon #2600 (trade name) manufactured by Mitsubishi Chemical Corporation) in place of an organic dye, is unsatisfactory in jet-black color and surface smoothness.

CITATION LIST

Patent Literature

Patent Literature 1: JP2011-132453A
Patent Literature 2: JP2010-121121A
Patent Literature 3: WO2013/147143A1
Patent Literature 4: JP2015-172150A
Patent Literature 5: JP2013-112781A
Patent Literature 6: JP2005-132970A

SUMMARY OF INVENTION

Technical Problem

An object of the present invention is to provide a cellulose resin composition capable of forming a molded body having a high-quality appearance and scratch resistance, a molded body formed by using the resin composition, and a product using the molded body.

Solution to Problem

According to an aspect of the present invention, there is provided a cellulose resin composition comprising a cellulose derivative (A) and a lubricant (B), wherein the cellulose derivative (A) is an acylated cellulose obtained by substituting at least a part of hydrogen atoms of hydroxy groups of a cellulose with an acyl group having 2 to 4 carbon atoms, and the content of the lubricant (B) is in the range of 0.1 to 10% by mass.

According to another aspect of the present invention, there is provided a molded body formed by using the above cellulose resin composition.

According to another aspect of the present invention, there is provided a product using the above molded body.

Advantageous Effects of Invention

According to exemplary embodiments of the present invention, it is possible to provide a cellulose resin composition capable of forming a molded body having a high-quality appearance and scratch resistance, a molded body formed by using the resin composition, and a product using the molded body.

DESCRIPTION OF EMBODIMENTS

Preferred exemplary embodiments of the present invention will be described below.

The cellulose resin composition according to the present exemplary embodiment includes a cellulose derivative (A) and a lubricant (B), and the cellulose derivative (A) is an acylated cellulose in which at least a part of hydrogen atoms of hydroxy groups of cellulose are substituted with an acyl group having 2 to 4 carbon atoms.

The content of the lubricant (B) in the cellulose resin composition is preferably in the range of 0.1 to 10% by mass. The content of the lubricant (B) is preferably 0.1% by mass or more, more preferably 0.5% by mass or more, more preferably 1% by mass or more, and particularly preferably 2% by mass or more from the viewpoint of sufficiently obtaining the scratch resistance (friction resistance) due to the addition effect of the lubricant (B). The content of the lubricant (B) is preferably 10% by mass or less, more preferably 8% by mass or less, and still more preferably 6% by mass or less from the viewpoint of suppressing bleeding and maintaining a high-quality appearance. The content of the lubricant (B) in the cellulose resin composition can be a content with respect to the cellulose derivative (A), which is an essential component, or when other components such as a plasticizing component are included, the content of the lubricant (B) with respect to the cellulose resin composition is preferable.

By using the cellulose resin composition according to the present exemplary embodiment, a molded body having a high-quality appearance and scratch resistance can be obtained. The higher the glossiness of the molded body, the higher the appearance quality can be obtained. When a black colorant is included, the lower the brightness, the higher the jet-blackness can be obtained, and accordingly the higher the appearance quality can be obtained.

The cellulose derivative (A) is an acylated cellulose in which at least a part of hydrogen atoms of hydroxy groups of cellulose is substituted with an acyl group having 2 to 4 carbon atoms. The acyl group is at least one acyl group selected from acyl groups having 2 to 4 carbon atoms (acetyl group, propionyl group, butyryl group), and acetyl group or/and propionyl group are preferable.

The cellulose derivative (A) may be a mixture of two or more kinds of these acylated celluloses. For example, cellulose acetate (CA) can be mixed with cellulose acetate propionate (CAP) or cellulose acetate butyrate (CAB). In this case, it is possible to obtain a high elastic modulus mainly derived from CA and a high formability and flexibility mainly derived from CAP and CAB.

The lubricant (B) is preferably at least one kind selected from a fatty acid metal salt, a fatty acid amide lubricant, an aliphatic urea compound, a silicone-based lubricant, and a fatty acid ester lubricant.

In the above fatty acid metal salt, the fatty acid amide lubricant, the aliphatic urea compound, and the fatty acid ester lubricant, their melting point is preferably 60° C. or higher, more preferably 80° C. or higher, still more preferably 100° C. or higher, and also preferably 200° C. or less, more preferably 180° C. or less, still more preferably 170° C. or less. It is preferable that the melting point of these lubricants is high from the viewpoint of suppressing bleed-out from the surface of the molded body to obtain a high-quality appearance, and it is preferable that the melting point of these lubricants is lower than the kneading temperature and the molding temperature from the viewpoint of easiness of melt mixing at the time of manufacturing the cellulose resin composition and moldability.

The molecular weight of the fatty acid metal salt, the fatty acid amide lubricant, the aliphatic urea compound, and the fatty acid ester lubricant is preferably at least 200, more preferably at least 300, and still more preferably at least 500. If the molecular weight is too low, it becomes easy to bleed out from the surface of the molded body, which may adversely affect the appearance.

As the lubricant (B), a fatty acid metal salt and a bis-fatty acid amide lubricant are preferable, and in particular, calcium stearate and ethylene bis stearamide are preferable. As the aliphatic urea compound used for the lubricant (B), bis-stearyl urea is preferable. The silicone-based lubricant used for the lubricant (B) preferably contains silica, and in particular, silicone impregnated with silica is preferably used.

The content of the lubricant (B) in the cellulose resin composition is preferably in the aforementioned range, but when the lubricant (B) is a fatty acid metal salt, a bis-fatty acid amide lubricant (e.g., ethylene bis stearamide), or an aliphatic urea compound (e.g., bis stearyl urea), the content of the lubricant (B) in the cellulose resin composition is particularly preferably in the range of 1 to 4% by mass. When the lubricant (B) is a silicone-based lubricant, the content of the lubricant (B) in the cellulose resin composition is preferably in the range of 1 to 4% by mass, and particularly preferably in the range of 2 to 4% by mass. When the lubricant (B) is a fatty acid amide (e.g., a monofatty acid amide such as stearamide (stearic acid amide)) or a fatty acid ester (e.g., a monofatty acid ester such as glycerin monostearate), which are a fatty acid derivative having a relatively low molecular weight (less than 500), it is particularly preferable that the content of the lubricant (B) in the cellulose resin composition is in the range of 1 to 2% by mass.

In light of easiness of production and moldability of the cellulose resin composition, it is preferable to contain the plasticizing component (C). In particular, when acetyl cellulose having a high melting point is used as the cellulose derivative (A) and injection molding or hot press molding is performed, it is preferable that the cellulose resin composition contains the plasticizing component (C).

In addition, when using the cellulose derivative (A) having an acyl group other than an acetyl group, such as acetylpropionylcellulose or acetylbutyrylcellulose, the necessity of the plasticizing component (C) is lowered in accordance with the degree of substitution by the acyl group and the increase in the carbon number of the acyl group, but it is preferable that the cellulose derivative (A) contains the plasticizing component (C) when injection molding or thermal press molding is performed.

As the plasticizing component (C), an aliphatic polyester and an adipic acid ester plasticizer are preferable, particularly aliphatic polyesters such as polybutylene succinate and polybutylene succinate adipate, and aliphatic adipic acid esters such as bis(2-ethylhexyl) adipate are preferable, and particularly polybutylene succinate and bis(2-ethylhexyl) adipate are preferable.

The content of the plasticizing component (C) in the cellulose resin composition can be set in the range of 0.1 to 100 parts by mass with respect to 100 parts by mass of the cellulose derivative (A), the range of 0.1 to 70 parts by mass is preferable, the range of 0.1 to 40 parts by mass is more preferable, the range of 1 to 30 parts by mass is still more preferable, and it can be prepared according to the type of the plasticizing component.

When the cellulose derivative (A) is cellulose acetate (CA) (acetylcellulose), the content of the plasticizing component (C) in the cellulose resin composition is preferably in the range of 5 to 100 parts by mass, more preferably in the range of 10 to 70 parts by mass, and still more preferably in the range of 10 to 50 parts by mass, with respect to 100 parts by mass of the cellulose derivative (A).

When the cellulose derivative (A) has at least a propionyl group or a butyryl group as the acyl group, for example, in the case of cellulose acetate propionate (CAP) (acetyl propionyl cellulose), in the case of cellulose propionate (CP) (propionyl cellulose), in the case of cellulose acetate butyrate (CAB) (acetyl butyryl cellulose), the content of the plasticizing component (C) in the cellulose resin composition is preferably in the range of 0.1 to 40 parts by mass, more preferably in the range of 1 to 30 parts by mass, more preferably in the range of 1 to 25 parts by mass, and particularly preferably in the range of 1 to 20 parts by mass, with regard to per 100 parts by mass of the cellulose derivative (A).

The cellulose resin composition according to the present exemplary embodiment may further include a colorant, and preferably includes a black colorant. As the black colorant, carbon black is preferable. The molded body obtained using the cellulose resin composition according to the present exemplary embodiment including the black colorant has a high glossiness and a low brightness (high jet-blackness) and can have a high quality appearance.

The content of the colorant such as the black colorant in the cellulose resin composition can be set in the range of 0.01 to 10% by mass.

As an example of a cellulose resin composition according to the present exemplary embodiment, there is provided a cellulose resin composition comprising an acylated cellulose as the cellulose derivative (A), calcium stearate as the lubricant (B), an aliphatic polyester or an aliphatic adipic acid ester as the plasticizing component (C), and a carbon black as the black colorant, where the content of the lubricant (B) is in the range of 0.1 to 10% by mass, the content of the plasticizing component (C) is in the range of 0.1 to 100 parts by mass with respect to 100 parts by weight of the cellulose derivative (A), the content of the black colorant is in the range of 0.05 to 1% by mass. In this cellulose resin composition, the content of the lubricant (B) is preferably in the range of 0.5 to 6% by mass, more preferably in the range of 1 to 4% by mass, the content of the plasticizing component (C) is preferably in the range of 1 to 20 parts by mass with respect to 100 parts by mass of the cellulose derivative (A), more preferably in the range of 1 to 15 parts by mass, and further the content of the black colorant preferably is in the range of 0.05 to 0.3% by mass.

Hereinafter, exemplary embodiments of the present invention will be described in more detail.

(Cellulose Derivative (A))

As the cellulose derivative (A) included in the cellulose resin composition according to the exemplary embodiment of the present invention, a cellulose derivative in which an acyl group having 2 to 4 carbon atoms is introduced into at least a part of hydroxy groups of cellulose used as a raw material can be used.

Cellulose is a straight-chain polymer obtained by polymerizing β-D-glucose molecules (β-D-glucopyranose) represented by the following formula (1) via a β (1→4) glycoside bond. Each of glucose units constituting cellulose has three hydroxy groups (in the formula, n represents a natural number). In the exemplary embodiment, an acyl group is introduced into such cellulose by using these hydroxy groups.

[Formula 1]

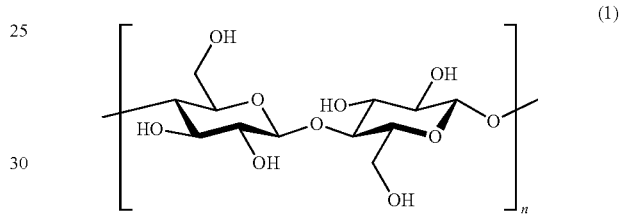

(1)

Cellulose is a main component of a plant and can be obtained by a separation treatment for removing other components such as lignin from a plant. Other than those thus obtained, cotton (for example, cotton linters) having a high cellulose content and pulp (for example, wood pulp) can be used directly or after they are purified. As the shape, size and form of the cellulose or a derivative thereof to be used as a raw material, a powder form cellulose or a derivative thereof having an appropriate particle size and particle shape is preferably used in view of reactivity, solid-liquid separation and handling. For example, a fibrous or powdery cellulose or a derivative thereof having a diameter of 1 to 100 μm (preferably 10 to 50 μm) and a length of 10 μm to 100 mm (preferably 100 μm to 10 mm) can be used.

The polymerization degree of a cellulose in terms of polymerization degree (average polymerization degree) of glucose preferably falls within the range of 50 to 5000, more preferably 100 to 3000 and further preferably 100 to 3000. If the polymerization degree is extremely low, the strength and heat resistance of the produced resin may not be sufficient in some cases. Conversely, if the polymerization degree is extremely high, the melt viscosity of the produced resin is extremely high, interfering with molding in some cases.

The cellulose derivative (A) (cellulose resin) used in the exemplary embodiment can be obtained by introducing an acyl group having 2 to 4 carbon atoms by use of hydroxy groups of a cellulose. A single type or two types or more of acyl groups may be introduced as the acyl group.

The above acyl group can be introduced by reacting a hydroxy group of a cellulose and an acylating agent. The acyl group corresponds to an organic group portion introduced in place of a hydrogen atom of a hydroxy group of a cellulose. The acylating agent is a compound having at last one functional group reactive to a hydroxy group of a cellulose; for example, compounds having a carboxyl group, a carboxylic halide group or a carboxylic anhydride group, can be mentioned. Specific examples of the compound include aliphatic monocarboxylic acid, an acid halide and acid anhydride thereof.

Examples of an acyl group having 2 to 4 carbon atoms include an acetyl group, a propionyl group, a butyryl group and an isobutyryl group. Of them, an acyl group (acetyl group, propionyl group) having 2 or 3 carbon atoms is preferable. A single type or two types or more of acyl groups can be introduced into a cellulose. More specifically, the cellulose resin in the exemplary embodiment is obtained by substituting the hydrogen atom of a hydroxy group of a cellulose with an acyl group having 2 to 4 carbon atoms.

As the acyl group, an acetyl group or/and propionyl group are preferably used. Examples of the cellulose resin include acetyl cellulose, propionyl cellulose and acetyl propionyl cellulose.

The average number of acyl groups to be introduced per glucose unit of a cellulose ($DS_{AC}$) (an acyl group introduction ratio); in other words, the average number of hydroxyl groups substituted with acyl groups per glucose unit (degree of substitution of a hydroxyl group) can be set to fall within the range of 0.1 to 3.0. In order to obtain an introduction effect of an acyl group sufficiently, particularly, in view of e.g., water resistance and flowability, $DS_{AC}$ is preferably 2.0 or more, more preferably 2.2 or more and further preferably 2.4 or more. In order to obtain the effect of other groups (e.g., hydroxy group) while obtaining the introduction effect of an acyl group sufficiently, $DS_{AC}$ is preferably 2.9 or less and more preferably 2.8 or less.

For acetyl cellulose, the degree of substitution with acetyl group ($DS_{AC}$) is preferably from 2.0 to 3.0, more preferably from 2.2 to 2.9, and still more preferably from 2.4 to 2.8. For propionyl cellulose, the degree of substitution with propionyl group ($DS_{AC}$) is, for example, preferably from 2.0 to 2.9, more preferably from 2.2 to 2.8, and still more preferably from 2.4 to 2.6. For acetyl propionyl cellulose, the degree of substitution with the acetyl group ($DS_{AC}$) is preferably from 0.05 to 0.5, more preferably from 0.1 to 0.3, and the degree of substitution with the propionyl group ($DS_{AC}$) is, for example, preferably from 2.0 to 2.9, more preferably from 2.2 to 2.8, and still preferably from 2.4 to 2.6.

By introducing an acyl group as mentioned above into a cellulose, it is possible to reduce intermolecular force (intramolecular bond) of the cellulose and plasticity thereof can be improved.

As the residual amount of hydroxy groups increases, the maximum strength and heat-resistance of the cellulose resin tend to increase; whereas water absorbability tends to increase. In contrast, as the conversion rate (degree of substitution) of hydroxy groups increases, water absorbability tends to decrease, plasticity and breaking strain tend to increase; whereas, maximum strength and heat resistance tend to decrease. In consideration of these tendencies etc., the conversion rate of hydroxy groups can be appropriately set.

The average number of the remaining hydroxy groups per glucose unit of a cellulose resin (hydroxy group remaining degree) can be set to fall within the range of 0 to 2.9. In view of e.g., maximum strength and heat-resistance, hydroxy groups may remain. For example, the hydroxy group remaining degree may be 0.01 or more and further 0.1 or more. Particularly, in view of flowability, the hydroxy group remaining degree of a final cellulose resin is preferably 1.0 or less, more preferably 0.8 or less and particularly preferably 0.6 or less. Further, in view of, e.g., water resistance and impact resistance in addition to flowability, the hydroxy group remaining degree is preferably 0.6 or less, more preferably 0.5 or less, further preferably 0.4 or less, and particularly preferably 0.2 or less.

The molecular weight of a cellulose resin, more specifically, the weight average molecular weight thereof falls within the range of preferably 10000 to 200000, more preferably, 50000 to 200000 and further preferably 50000 to 150000. If the molecular weight is excessively large, flowability becomes low. As a result, it becomes difficult to not only process the cellulose resin but also uniformly mix it. In contrast, if the molecular weight is excessively small, physical properties thereof such as impact resistance decrease. The weight average molecular weight can be determined by gel permeation chromatography (GPC) (commercially available standard polystyrene can be used as a reference sample).

(Lubricant (B))

The lubricant used in the present invention can be appropriately selected from known lubricants, and includes fatty acid derivatives (fatty acid metal salt lubricants (metal soaps), fatty acid amide lubricants, fatty acid ester lubricants, and the like), urea compounds (aliphatic urea compounds, aromatic urea compounds), silicone-based lubricants, and other lubricants such as fatty acid lubricants, alcohol lubricants, waxes, polymer lubricants, nonionic surfactant lubricants, and the like. Examples of the fatty acid derivatives include a higher fatty acid ester partially saponified product such as a montanic acid ester partially saponified product.

Examples of the fatty acid metal salt lubricants (metal soaps) include compounds of higher fatty acids having 12 or more carbon atoms such as stearic acid, behenic acid, lauric acid, succinic acid, hydroxystearic acid, ricinoleic acid, oleic acid, palmitic acid, erucic acid, montanic acid, and the like, with metals such as Li, Na, Mg, Ca, Sr, Ba, Zn, Cd, Al, Sn, Pb, Cd, and the like. Suitable fatty acid metal salt lubricants include calcium stearate, zinc stearate, magnesium stearate, sodium stearate, aluminum stearate, zinc laurate, calcium oleate, zinc oleate, magnesium oleate, and the like. In the fatty acid metal salt lubricant (metal soap), at least one kind selected from calcium stearate, zinc stearate, magnesium stearate, aluminum monostearate, aluminum distearate, aluminum tristearate, and zinc laurate is preferable, in particular, calcium stearate and zinc stearate are preferable, and calcium stearate is more preferable.

Examples of the fatty acid amide lubricants include a saturated fatty acid amide lubricant, an unsaturated fatty acid amide lubricant, a monofatty acid amide lubricant, a bis-fatty acid amide lubricant, and a monoalkylolamide lubricant. Examples of the saturated fatty acid amide lubricant include stearic acid amide (stearamide), behenic acid amide, hydroxystearamide, palmitic acid amide, lauric acid amide, and the like. Examples of the unsaturated fatty acid amide lubricant include erucic acid amide, oleic acid amide (oleamide), and the like. Examples of the bis-fatty acid amide lubricant include methylene bis behenic acid amide, methylene bis stearamide, methylene bis oleamide, ethylene bis stearamide, hexamethylene bis stearamide, hexamethylene bis oleamide, and the like. Examples of the monoalkylamide lubricant include N-(2-hydroxyethyl) laureate amide, N-(2-hydroxyethyl) stearamide, N-(2-hydroxymethyl) stearamide, and the like. In the fatty acid amide lubricant, a saturated fatty acid amide lubricant such as stearamide, and a bis-fatty acid amide lubricant such as ethylene bis stearamide are preferable, and the bis-fatty acid amide lubricant is more preferable, and among these, ethylene bis stearamide is particularly preferable.

Examples of the urea compound include a compound having a urea group (—NH—C(=O)—NH—) and a long-chain organic group having 6 to 33 carbon atoms represented by the following Formula (2).

[Formula 2]

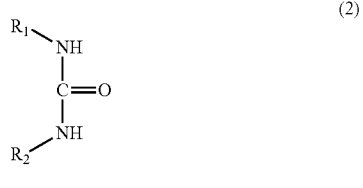

$R_1 = C_nH_{2n+1}, R_2 = C_mH_{2m+1}$

In $R_1$ and $R_2$, n and m are in the range of 6-33, and preferably in the range of 12-30. The values of n and m may be different or the same.

Urea compounds can be synthesized by reacting an aliphatic monoisocyanate having 6 to 33 carbon atoms with water or an aliphatic monoamine. The aliphatic monoisocyanate or aliphatic monoamine may be linear or have branched side chains. For example, aliphatic monoisocyanates include hexyl isocyanate, octyl isocyanate, decyl isocyanate, dodecyl isocyanate, octadecyl isocyanate, and the like. Aliphatic monoamines include hexylamine, octylamine, dodecanamine, stearylamine, and the like. In the synthesis of the urea compound, for example, by adding an appropriate amount of water to an aliphatic monoisocyanate dissolved in a solvent, an amine is generated by the reaction of the isocyanate with water, and further, the reaction of the isocyanate with the amine occurs, whereby the urea compound is obtained.

Examples of the silicone-based lubricants include dimethylpolysiloxane and its modified properties, carboxyl-modified silicone, α-methylstyrene-modified silicone, α-olefin-modified silicone, polyether-modified silicone, fluorine-modified silicone, hydrophilic-special-modified silicone, olefin-polyether-modified silicone, epoxy-modified silicone, amino-modified silicone, amide-modified silicone, alcohol-modified silicone, and the like.

In the silicone-based lubricants, polyorganosiloxane is preferable. The polyorganosiloxane has a siloxane bond as a main chain and an organic group in a side chain, and examples of the organic group include a methyl group, a vinyl group, an ethyl group, a propyl group, and a phenyl group, and polydimethylsiloxane is particularly preferable. The polyorganosiloxane is preferably ultra high molecular weight polydimethylsiloxane, and the number average molecular weight thereof is preferably 40000 or more, more preferably 100000 or more, and particularly preferably 1000000 or more. This number average molecular weight measurement can be determined by gel permeation chromatography (GPC) (standard polystyrene commercially available as a standard sample can be used).

The silicone-based lubricants preferably further contain inorganic oxide particles in addition to silicone such as polyorganosiloxane, and in particular, it is preferable to impregnate the inorganic oxide particles with the silicone. By impregnating the inorganic oxide particles with the silicone, the silicone is easily fixed in the resin and is less likely to bleed out. Examples of the inorganic oxide particles include silica ($SiO_2$), SiO, aluminosilicate, and $MgSiO_3$. In light of compatibility with the silicone, silica is preferable, and fumed silica is particularly preferable. The ratio of the silicone to inorganic oxide particles is preferably from 60:40 to 80:20, more preferably from 60:40 to 70:30. Specific examples of such a silicone-based lubricant include "Genioplast® Pellet S" (product name) manufactured by Wacker Asahi Kasei Silicone Co., Ltd., and the like.

Examples of the fatty acid ester lubricants include a lower alcohol ester of a fatty acid, a polyhydric alcohol ester of a fatty acid, a polyglycol ester of a fatty acid, and an aliphatic alcohol ester of a fatty acid, and examples thereof include glycerin monostearate, butyl stearate, monoglyceride stearate, pentaerythritol tetrastearate, stearyl stearate, ethylene glycol monostearate, ethylene glycol montanate, and glycerol montanate.

Examples of the fatty acid lubricants include higher fatty acids, oxyfatty acids, and the like. The higher fatty acid preferably has 12 to 35 carbon atoms, and may include caproic acid, stearic acid, oleic acid, erucic acid, palmitic acid, myristic acid, arachidic acid, behenic acid, montanic acid, and the like.

Examples of the alcohol lubricants include polyhydric alcohol, polyglycol, polyglycerol, and the like, and examples thereof include cetyl alcohol, stearyl alcohol, oleyl alcohol, mannitol, and the like.

Examples of waxes include petroleum waxes such as paraffin wax, microcrystalline wax, and polyolefin wax; natural waxy substances such as carnauba wax, montan wax, candelilla wax, microcrystalline wax, beeswax, and pine resin. Examples include polyethylene waxes with low polymerization, and the number average molecular weight thereof is preferably 10,000 or less, more preferably 8,000 or less, and particularly preferably 6,000 or less. Other examples include polypropylene waxes, and the number average molecular weight thereof is preferably 10,000 or less, more preferably 8,000 or less, and particularly preferably 6,000 or less.

Examples of polymer lubricants include alkyl acrylate-alkyl methacrylate-styrene copolymers (the number average molecular weight thereof is 3,000 or more, preferably 5,000-50,000). Specific examples include Paraloid K125P (product name), which is a polymer lubricant manufactured by Kureha Corporation, and Methablene L-1000 (product name), which is an acrylic-based polymer manufactured by Mitsubishi Rayon Co., Ltd.

Examples of the nonionic surfactant lubricants include Electrostripper TS-2 (product name), Electrostripper TS-3 (product name), which are manufactured by Kao Corporation, and the like.

Among these, the fatty acid metal salt, the bis stearamide lubricant, the silicone-based lubricant, the aliphatic urea compound, and the fatty acid ester lubricant are preferable as the lubricant used in the present invention.

The lubricant used in the present invention is preferably the fatty acid metal salt, the bis stearamide lubricant, the aliphatic urea compound, or the silicone-based lubricant, and more preferably the fatty acid metal salt or the silicone-based lubricant, from the viewpoint of bleed-out resistance of the obtained molding material. In addition, from the viewpoint of bleed-out resistance, the molecular weight of the lubricant (other than the silicone-based lubricant and the polymer lubricant) is preferably 400 or more, more preferably 500 or more, the melting point of the lubricant is preferably 100° C. or more, more preferably 110° C. or more, and still more preferably 120° C. or more. On the other hand, from the viewpoint of moldability, the melting point of the lubricant is preferably 200° C. or less, more preferably 180° C. or less, and still more preferably 170° C. or less.

Further, as the lubricant used in the present invention, from the viewpoint of the brightness of the obtained molded body, the fatty acid metal salt, the bis stearamide lubricant, and the fatty acid ester lubricant are preferable, and the fatty acid metal salt and the fatty acid ester lubricant are more preferable.

(Plasticizing Component (C))

The cellulose resin composition according to an exemplary embodiment of the present invention may include a plasticizing component. The plasticizing component may be a polymer or a small molecule compound.

As the plasticizing component, a component commonly used for molding a polymer can be used. For example, polyester-based plasticizing components, glycerine-based plasticizing components, polyvalent carboxylic acid ester-based plasticizing components, polyalkylene glycol-based plasticizing components, epoxy-based plasticizing components, and the like can be mentioned.

Examples of the polyester-based plasticizing components include a polyester composed of an acid component such as succinic acid, adipic acid, sebatic acid, terephthalic acid, isophthalic acid, naphthalene dicarboxylic acid, diphenyldicarboxylic acid, and rosin, and a diol component such as propylene glycol, 1,3-butanediol, 1,4-butanediol, 1,6-hexanediol, ethylene glycol, and diethylene glycol; and a polyester composed of a hydroxycarboxylic acid such as polycaprolactone. These polyesters may be terminated with monofunctional carboxylic acids or monofunctional alcohols. Also, the polyesters may be terminated with an epoxy compound or the like.

As the polyester-based plasticizing components, aliphatic polyesters such as polybutylene succinate, polybutylene succinate adipate, polycaprolactone, polyhydroxybutyrate, polyhydroxybutyrate hexanate, and the like are more preferable, and polybutylene succinate is particularly preferable.

Examples of the glycerine-based plasticizing components include glycerine monoacetomonolaurate, glycerine diacetomonolaurate, glycerine monoacetomonostearate, glycerine diacetomonooleate, and glycerine monoacetomonomontanate.

Examples of the polyvalent carboxylic acid ester-based plasticizing components include phthalic acid C1-12 alkyl esters such as dimethyl phthalate, diethyl phthalate, dibutyl phthalate, dihexyl phthalate, dioctyl phthalate, diheptyl phthalate, and di-2-ethylhexyl phthalate; phthalic acid C6-12 aryl esters such as dibenzyl phthalate; phthalic acid C6-12 aryl-C1-3 alkyl esters such as butyl benzyl phthalate; phthalic acid C1-6 alkoxy-C1-12 alkyl esters such as dimethoxyethyl phthalate; C1-6 alkyl phthalyl-C2-4 alkylene glycolate such as ethyl phthalyl ethylene glycolate, butyl phthalyl butylene glycolate; trimellitic acid tri C1-12 alkyl esters such as trimethyl trimellitate, triethyl trimellitate, tributyl trimellitate, trioctyl trimellitate, trihexyl trimellitate, tri2-ethylhexyl trimellitate; pyromellitic acid tetra C1-12 alkyl esters such as tetraoctyl pyromellite; adipic acid esters such as dibutyl adipate, dioctyl adipate, butoxyethylbenzyl adipate, dibutoxyethyl adipate, bis(2-ethylhexyl) adipate, diisodecyl adipate, n-octyl-n-decyl adipate, methyldiglycol butyldiglycol adipate, benzylmethyldiglycol adipate, and benzylbutyldiglycol adipate; citric acid esters such as acetyl triethyl citrate, acetyl tributyl citrate; azelaic acid esters such as diethyl azelate, dibutyl azelate, dioctyl azelate, di-2-ethylhexyl azelate; and sebacic acid esters such as dibutyl sebacate, dioctyl sebacate, di-2-ethylhexyl sebacate.

Examples of the polyalkylene glycol-based plasticizing components include polyalkylene glycols such as triethylene glycol bis(2-ethylhexanoate), polyethylene glycol, polypropylene glycol, poly(ethylene oxide-propylene oxide) blocks and/or random copolymers, polytetramethylene glycol, ethylene oxide addition polymers of bisphenols, propylene oxide addition polymers of bisphenols, tetrahydrofuran addition polymers of bisphenols; and terminal epoxy modified compounds thereof, terminal ester modified compounds thereof, and terminal ether modified compounds thereof.

As the epoxy-based plasticizing component, epoxy triglyceride or the like made from alkyl epoxystearate and soybean oil, or epoxy resin made from bisphenol A and epichlorohydrin used as main raw material can also be used.

Other plasticizing components include dibasic acid mixed esters such as adipic acid mixed esters (mixed adipates) such as DAIFATTY-101 (product name, Daihachi Chemical Industry Co., Ltd.), DAIFATTY-121 (product name, Daihachi Chemical Industry Co., Ltd.); benzoic acid esters or fatty acid esters of aliphatic polyol, such as neopentyl glycol dibenzoate, diethylene glycol dibenzoate, triethylene glycol di-2-ethylbutyrate; amides such as fatty acid amides such as stearamides, or sulfonamides such as N-butyl benzene sulfonamide; ester oligomers such as caprolactone oligomers; aliphatic carboxylic esters such as butyl oleate; oxyacid esters such as methyl acetylricinoleate, butyl acetylricinoleate; lower fatty acid esters of polyhydric alcohols such as pentaerythritol, glycerol, trimethylol propane, sorbitol (e.g. diglycerine tetraacetate); glycol esters such as dipropylene glycol dibenzoate; monomeric phosphoric acid esters such as triphenylphosphate, tricresylphosphate, cresyldiphenylphosphate, trixylylphosphate, dicresyl-2,6-dimethylphenylphosphate, tris(2,6-dimethylphenyl)phosphate; oligomeric phosphoric acid esters such as resorcine bis(diphenylphosphate), bisphenol A bis(diphenylphosphate), resorcine bis[(bis-2,6-dimethylphenyl)phosphate, hydroquinone bis[(bis-2,6-dimethylphenyl)phosphate], 4,4'-biphenol bis[(bis-2,6-dimethylphenyl)phosphate].

In the plasticizing component, from the viewpoint of scratch resistance, aliphatic polyesters and adipic acid esters are preferable, and polybutylene succinate and bis(2-ethylhexyl)adipate are particularly preferable.

When the cellulose resin composition according to the exemplary embodiment of the present invention contains the plasticizing component (C), the content thereof can be set in the range of 0.1 to 100 parts by mass, preferably in the range of 0.1 to 70 parts by mass, more preferably in the range of 0.1 to 40 parts by mass, and still more preferably in the range of 1 to 30 parts by mass, with respect to 100 parts by mass of the cellulose derivative (A).

When the cellulose derivative (A) is cellulose acetate (CA) (acetylcellulose), the content of the plasticizing component (C) in the cellulose resin composition is preferably in the range of 5 to 100 parts by mass, more preferably in the range of 10 to 70 parts by mass, and still more preferably in the range of 10 to 50 parts by mass, with respect to 100 parts by mass of the cellulose derivative (A). When the plasticizing component is a polymer such as an aliphatic polyester such as polybutylene succinate or the like, the content is preferably 10 to 70 parts by mass, and particularly preferably 20 to 50 parts by mass. When the plasticizing component is a small molecule such as an aliphatic adipic acid ester such as bis(2-ethylhexyl)adipate, the content is preferably 10 to 50 parts by weight, and particularly preferably 10 to 40 parts by weight.

When the cellulose derivative (A) has at least a propionyl group or a butyryl group as the acyl group, for example, in the case of cellulose acetate propionate (CAP) (acetylpropionylcellulose), in the case of cellulose propionate (CP) (propionyl cellulose), and in the case of cellulose acetate butyrate (CAB) (acetylbutyrylcellulose), the content of the plasticizing component (C) in the cellulose-based resin composition is preferably in the range of 0.1 to 40 parts by mass, more preferably in the range of 1 to 30 parts by mass, still more preferably in the range of 1 to 25 parts by mass, and particularly preferably in the range of 1 to 20 parts by mass, with respect to 100 parts by mass of the cellulose derivative (A).

When the plasticizing component is a polymer such as an aliphatic polyester such as polybutylene succinate, the content of the plasticizing component (C) is preferably 5 to 40 parts by mass, more preferably 7 to 30 parts by mass, and particularly preferably 10 to 25 parts by mass, with respect to 100 parts by mass of the cellulose derivative (A).

When the plasticizing component is a small molecule such as an aliphatic adipic acid ester such as bis(2-ethylhexyl)adipate, the content of the plasticizing component (C) is preferably 1 to 30 parts by mass, more preferably 5 to 25 parts by mass, or preferably 1 to 15 parts by mass, particularly preferably 5 to 15 parts by mass, with respect to 100 parts by mass of the cellulose derivative (A).

(Colorant) The cellulose resin composition according to the exemplary embodiment of the present invention may include a colorant such as a black colorant.

The content of the colorant such as the black colorant can be set in the range of 0.01 to 10% by mass. From the viewpoint of obtaining a sufficient coloring effect, the content of the black colorant is preferably 0.05% by mass or more, preferably 0.1% by mass or more, and more preferably 0.2% by mass or more. From the viewpoint of suppressing the excess amount of the black colorant while obtaining a sufficient coloring effect, the content is preferably 5% by mass or less, more preferably 3% by mass or less, still more preferably 2% by mass or less, and for example, 1.5% by mass or less can be set. The content of the colorant in the cellulose resin composition can be the content with respect to the cellulose derivative (A), which is an essential component, or when other components such as a plasticizing component are included, it is preferable to be the content with respect to the cellulose resin composition.

In addition, from the viewpoint of appearance such as glossiness, the content of the black colorant is preferably 1% by mass or less, more preferably 0.3% by mass or less, still more preferably 0.2% by mass or less, and particularly preferably 0.1% by mass or less. In particular, when a volatile low molecular weight plasticizer is used as the plasticizing component, the fluidity of the resin composition can be ensured at the time of molding by reducing the content of the black colorant, and the resin composition can be satisfactorily transferred to a mold after the volatile component such as the plasticizer escapes.

As the black colorant, carbon black is preferable.

The average particle size of the carbon black is preferably from 1 to 20 nm, more preferably from 5 to 20 nm, and still more preferably from 8 to 18 nm. The smaller the average particle diameter, the lower the brightness of the molded body, and accordingly the high appearance of black (jet black color) is likely to be obtained. Conversely, the larger the average particle diameter, the higher the dispersibility tends to be. From these viewpoints, it is preferable to use a carbon black having a particle diameter in the above range.

The average particle diameter is an arithmetic average diameter of particles obtained by observing particles of carbon black with an electron microscope.

The specific surface area of the carbon black is preferably not less than 140 $m^2/g$, and more preferably not less than 180 $m^2/g$ from the viewpoint of jet blackness and the like of the molded product. From the viewpoint of dispersibility, the carbon black of 1000 $m^2/g$ or less can be used, the carbon black of 700 $m^2/g$ or less can be used, and the carbon black of 500 $m^2/g$ or less can be used. Relation between particle diameter and specific surface area, generally the smaller the particle diameter, the larger the specific surface area. From the viewpoint of the brightness and appearance of the molded product and the dispersibility of the particles, it is preferable to use carbon black having a BET specific surface area in the above range.

This specific surface area is the BET specific surface area (JIS K6217) obtained by S-BET equation from the nitrogen-adsorbed amount.

Further, the carbon black is preferably acidic, specifically preferably has pH5 or less, more preferably pH4 or less, and still more preferably pH3.5 or less. By using such an acidic carbon black (having a low pH value), the brightness of the molded body can be lowered. For example, carbon blacks of preferably pH2.5 to 4, more preferably pH2.5 to 3.5 can be suitably used.

The pH value is obtained by measuring a mixed solution of carbon black and distilled water by a glass-electrode pH meter and specifically, measured in accordance with the following method. A pure water (100 ml) boiled and degassed is added to a sample (10 g). The mixture is boiled on a hot plate for 15 minutes and cooled to room temperature. Thereafter, the supernatant is removed and pH of the resultant muddy substance is measured by a glass-electrode pH meter.

Due to interaction or binding of an acidic group (for example, carboxylic acid group) on the surface of such acidic carbon black and a polar group (for example, hydroxy group) of a cellulose resin, affinity thereof is improved and high dispersion of carbon black occurs, which presumably contributes to reduction in brightness.

As colorants other than the black colorant, organic or inorganic pigments or dyes can be used, and concretely, iron (III) oxide, chromium (III) oxide, and the like can be mentioned.

(Cellulose Resin Composition)

The cellulose resin composition according to the exemplary embodiment of the present invention includes a cellulose derivative (A), a lubricant (B), and optionally, a plasticizing component (C).

The content of the lubricant (B) in the cellulose resin composition is preferably in the range of 0.1 to 10% by mass as the mass ratio of the lubricant (B) to the cellulose derivative (A). The content of the lubricant (B) is more preferably 0.5% by mass or more, more preferably 1% by mass or more, and particularly preferably 2% by mass or more from the viewpoint of sufficiently obtaining the scratch resistance (friction resistance) due to the addition effect of the lubricant (B). The content of the lubricant (B) is preferably 10% by mass or less, more preferably 8% by mass or less, and still more preferably 6% by mass or less from the viewpoint of suppressing bleeding out and maintaining a high-quality appearance.

The cellulose resin composition according to the exemplary embodiment of the present invention may contain other components as long as the desired appearance and characteristics are not impaired when it is formed into a molded body, but from the viewpoint of obtaining a molded body having a high-quality appearance, it is preferable that the total content of the cellulose derivative (A), the lubricant (B), and the plasticizing component (C) is larger. For example, the total amount of the cellulose derivative (A), the lubricant (B), and the plasticizing component (C) can be set in the range of 90 to 100% by mass with respect to the entire cellulose resin composition, but is preferably 95% by mass or more, more preferably 98% by mass or more, and still more preferably 99% by mass or more.

As the other components, additives usually used in common resin materials for molding may be contained. Examples of the additives include an antioxidant such as a phenol-based compound and phosphorous compound, a colorant, a light stabilizer, an ultraviolet absorber, an antistatic agent, an antibacterial/antifungal agent, and a flame retardant. In particular, additives usually used in common cellulose resins may be contained. Examples of the additives include a plasticizer, a flame retardant and ultraviolet absorber.

(Method for Producing a Cellulose Resin Composition)

A method for producing the cellulose resin composition according to the exemplary embodiment of the present invention is not particularly limited, and for example, the cellulose resin composition can be obtained by melting and mixing a cellulose resin, a lubricant, and, if necessary, a plasticizing component or/and other additives in a usual mixer. As the mixer, for example, a tumbler mixer, a ribbon blender, a single screw and a multi-screw extruder, a kneader or a compounding apparatus such as a kneading roll, can be used. After the melt-mixing, if necessary, granulation into an appropriate shape can be carried out; for example, pellets can be formed by a pelletizer.

(Molded Body)

The molded body formed using the cellulose resin composition according to the exemplary embodiment of the present invention can be formed into a desired shape by a usual molding method, and the shape is not limited and the thickness of the molded body is not limited. From the viewpoint of the strength of the molded body, the thickness is preferably 0.5 mm or more, and more preferably 0.8 mm or more. However, in the case of manufacturing a film or the like by hot press molding or the like, the thickness is preferable to be 0.1 mm or more, and the thickness may be 0.3 mm or more. Also, the upper limit of the thickness of the molded body is not particularly limited and can be appropriately set depending on a desired e.g., shape and strength. Even if the thickness is set, for example, 10 mm or less and further 5 mm or less, high external-appearance quality as well as sufficient mechanical strength can be obtained.

Since the additive is distributed over the entire molded body (all directions including thickness direction), a molded body having a desired shape and high external-appearance quality can be obtained even if e.g., coating or a decorative film is not applied.

The cellulose resin composition according to the exemplary embodiment of the present invention can be formed into a molded body in accordance with an intended use by a common molding method such as injection molding, injection compression molding, injection blow molding, extrusion molding, blow molding, and hot press molding, or the like.

Since the molded body formed of the cellulose resin composition according to the exemplary embodiment of the present invention has high external-appearance quality and excellent mechanical characteristics, the molded body can be applied to a housing, an exterior package, a decorative plate, and a decorative film, and can be used in place of, for example, members used in electronic devices, home appliances, various containers, building materials, furniture, writing materials, automobiles and household articles. The molded body can be used in, for example, housing and exterior parts of electronic devices or home appliances, various storage cases, dishes, interior members of building materials, interior materials of automobiles and other daily necessities.

According to the exemplary embodiment of the present invention, it is possible to provide products containing a molded body formed of the resin composition of the present invention, such as electronic devices or home appliances, automobiles, building materials, furniture, writing materials and household articles.

Examples of use for electronic devices or home appliances include housing for personal computers, fixed phones, mobile phone terminals, smart phones, tablets, POS terminals, routers, projectors, speakers, lighting fixtures, calculators, remote controllers, refrigerators, washing machines, humidifiers, dehumidifiers, video recorders/players, vacuum cleaners, air conditioners, rice cookers, electric shavers, electric toothbrushes, dishwashers, and broadcast equipment; dial plates and outer packages for timepieces; and cases for mobile terminals such as smart phones.

Examples of use for automobiles include interior parts such as instrument panels, dashboards, cup holders, door trims, armrests, door handles, door locks, handles, brake levers, ventilators and shift levers.

Examples of use for building materials include interior members such as wall materials, floor materials, tiles, window frames and doorknobs.

Examples of use for furniture include packaging of drawers, bookshelves, tables and chairs.

Examples of use for writing materials include packaging of pens, pen cases, book covers, scissors, and cutters.

Examples of use for daily necessities include glass frames, containers for cosmetics, cosmetic boxes for commodities, main bodies of jewelries or exterior packages therefor, decorative parts for clothing such as buttons, exterior packages for earphones, main bodies of cards or exterior packages therefor, and business card dishes.

In addition, for example, as a sports-related article, a golf tee or a golf marker can be mentioned.

EXAMPLES

Hereinafter, the present invention will be described in more detail with reference to examples.

Examples 1-47, Comparative Examples 1-2

Cellulose derivatives, plasticizing components, lubricants, and carbon black shown in Tables 1 to 3 were prepared as constituent materials of a desired cellulose resin composition. The constituent materials were then mixed thoroughly by hand mixing at the blending ratios shown in Tables 1-3. The resin material was dried at 80° C. for 5 hours in advance.

A resin composition was formed using the obtained mixture in accordance with the following kneading method, and a molded body (sample for evaluation) was formed using the resin composition in accordance with the following molding method 1 or 2. The glossiness and brightness of the obtained molded bodies were evaluated, and a friction test and a bleed-out test were conducted, in accordance with the following measurement methods. The evaluation results of the molded bodies produced by the molding method 1 are shown in Tables 1 to 3.

Examples 48-56

Cellulose derivatives, plasticizing components, lubricants, and colorants shown in Tables 4 and 5 were prepared as constituent materials of a desired cellulose-based resin composition. The constituent materials were then mixed thoroughly by hand mixing at the blending ratios shown in Tables 4 and 5. The resin material was dried at 80° C. for 5 hours in advance.

A resin composition was formed using the obtained mixture in accordance with the following kneading method, and a molded body (sample for evaluation) was formed using the resin composition in accordance with the following molding method 1. The glossiness of the obtained molded body was evaluated, and a friction test and a bleed-out test were conducted, in accordance with the following measurement methods. The evaluation results of the molded bodies produced by the molding method 1 are shown in Tables 4 and 5.

Examples 57-61

Cellulose derivatives, plasticizing components, lubricants, and carbon black shown in Table 6 were prepared as constituent materials of a desired cellulose-based resin composition. The constituent materials were then mixed thoroughly by hand mixing at the blending ratios shown in Table 6. The resin material was dried at 80° C. for 5 hours in advance. The constituent materials and the composition ratio of Example 60 correspond to Example 38.

A resin composition was formed using the obtained mixture in accordance with the following kneading method, and a molded body (sample for evaluation) was formed using the resin composition in accordance with the following molding method 1. The glossiness and brightness of the obtained molded bodies were evaluated, and a friction test, a bleed-out test, a bending test, and an impact test were conducted, in accordance with the following measurement methods. Evaluation results are shown in Table 6.

The constituent materials used in the Examples and Comparative Examples are as follows.

Cellulose derivatives: cellulose acetate propionate, introduction ratio (degree of substitution) of propionyl group DS=2.49, introduction ratio (degree of substitution) of acetyl group DS=0.18 (manufactured by Eastman Chemical Company, trade name: CAP-482-20), weight average molecular weight 120,000 (in terms of standard polystyrene), number average molecular weight=39,000 (in terms of standard polystyrene)

PBS resin: polybutylene succinate (manufactured by PTTMCC Biochem Co., Ltd., trade name: FZ71PM), weight average molecular weight 110,000 (in terms of standard polystyrene), number average molecular weight=53,000 (in terms of standard polystyrene)

Adipic acid ester plasticizer: Bis(2-ethylhexyl)adipate (manufactured by Daihachi Chemical Industry Co., Ltd., product name: DOA)

Carbon Black 1: Acidic carbon black (average particle size: 13 nm, pH3) (manufactured by Mitsubishi Chemical Corporation, trade name: Mitsubishi Carbon Black #2650)

Carbon Black 2: Neutral carbon black (average particle size: 13 nm, pH6.5) (manufactured by Mitsubishi Chemical Corporation, trade name: Mitsubishi Carbon Black #2600)

Red Iron Oxide 1: Ryuka #100 (product name) manufactured by Mie Color Techno

Red Iron Oxide 2: Ryuka #300 (product name) manufactured by Mie Color Techno

Chromium Oxide (III): COLORTHERM Green GN-M (product name) manufactured by Lanxess Calcium Stearate: Calcium stearate S (product name) manufactured by NOF Corporation Zinc Stearate: NISSAN ELECTOL MZ-2 (trade name) manufactured by NOF Corporation Magnesium stearate: Magnesium stearate GP (product name) manufactured by NOF Corporation Aluminum monostearate: Aluminum stearate 300 (product name) manufactured by NOF Corporation Aluminum distearate: Aluminum stearate 600 (product name) manufactured by NOF Corporation Aluminum tristearate: Aluminum stearate 900 (product name) manufactured by NOF Corporation Zinc laurate: Zinc laurate GP (product name) manufactured by NOF Corporation Stearamide: Fatty acid amide S (product name) manufactured by Kao Corporation Ethylene bis stearamide: Kao Wax EB-FF (product name) manufactured by Kao Corporation Silicone-based lubricant: GENIOPLAST PELLET S (trade name) manufactured by Wacker Asahikasei Silicone Co., Ltd.

Glycerin Monostearate: RIKEMAR S-100 (trade name) manufactured by Riken Vitamin Co., Ltd.

Bis stearyl urea: a compound prepared by the following synthesis example 1.

(Method for Preparation of Molded Bodies/Preparation of Samples for Evaluation)

Synthesis Example 1

After 200 g of octadecyl isocyanate was dissolved in 200 g of 1,4-dioxane, 0.40 g of dibutyltin dilaurate and 10 mL of water were added thereto, and the mixture was stirred at room temperature overnight to obtain a clouded solution. Thereafter, a white solid was collected by suction filtration of the clouded solution, and an unreacted substance was removed by dispersing the white solid in chloroform and conducting suction filtration. The washed white solid was dried under vacuum at 105° C. for 2 hours to obtain a urea compound represented by the following formula (melting point=110° C.).

[Formula 3]

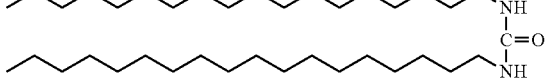

<Kneading Method>

The obtained mixture was put into a small twin-screw continuous-type kneader (manufactured by KURIMOTO, LTD., product name: S1 KRC Kneader), kneaded at a kneading temperature of 210° C. and a rotational speed of 140 to 150 m/min, and water-cooled, recovered and pelletized. The resulting pellet was dried at 80° C. for 5 hours.

<Molding Method 1: Injection Molding>

(Sample 1 for Evaluation)

The resulting pellets were again dried at 80° C. for 5 hours immediately before molding and then put in use, and molded by an injection molding machine (manufactured by Shibaura Machine Co., Ltd., product name: EC20P), to produce a molded body having the following shapes (evaluation sample 1).

Size of the molded body: thickness 2.0 mm, width 70 mm, length 70 mm

The molding conditions were set as follows.

Cylinder temperature of the molding machine: 210° C.,
Mold temperature: 65° C.,
Injection pressure: 50-60 MPa,
Pressure keeping: 50 MPa, A mold having a surface roughness Ra=1 nm prepared by mirror polishing treatment (surface roughness was evaluated by a laser microscopy OLS4100 (product name) manufactured by OLYMPUS Corporation) was used.

(Sample 2 for Evaluation)

The obtained pellets were molded into a multi-purpose test piece A conforming to JIS K7139 under the same molding condition as described above. However, the injection pressure was 70-90 MPa. The gripping portions at both ends were cut out from this multi-purpose test piece A to prepare a molded body (sample 2 for evaluation) having the following shape.

Size of the molded body: thickness: 4 mm, width: 10 mm, length: 80 mm

<Molding Method 2: Press Molding>

The obtained pellets were again dried at 110° C. for 2 hours immediately before molding and then put in use, and molded by a hot press molding machine (manufactured by TESTER SANGYO Co., Ltd., product name: SA-303-II-S Tabletop Test Press) at 190° C., to produce a press molded film having a circular shape with a thickness of 0.3 mm and a diameter of 100 mm A mold having a surface roughness Ra=1 nm prepared by mirror polishing treatment (surface roughness was evaluated by a laser microscopy OLS4100 (product name) manufactured by OLYMPUS Corporation) was used.

(Measurement of Glossiness)

The 20° specular gloss (GS20°) of the evaluation sample 1 obtained was measured by a gloss meter (product name: Gloss meter GM-268Plus, manufactured by Konica Minolta, Inc., compatible specifications: ISO 2813, ISO 7668, ASTM D 523, ASTM D 2457, DIN 67 530, JIS Z 8741, BS 3900, BS 6161 (Part12)).

(Measurement of Brightness)

Brightness was measured by determining the reflection of the evaluation sample 1 obtained above in accordance with the SCE mode (regular reflection is excluded) by a spectrophotometer (product name: spectrophotometer CM-3700A, manufactured by Konica Minolta, Inc., in accordance with JIS Z 8722 condition c, 1507724/1, CIE No. 15, ASTM E1164, DIN5033 Teil7). Measurement diameter/illumination diameter was SAV: 3×5 mm/5×7 mm; reflection measurement conditions were di: 8° and de: 8° (diffused illumination·8° direction light receiving); viewing field: 10°; light source: D65 light source; and UV conditions: 100% Full. The brightness herein refers to L* of CIE1976L*a*b* color space.

(Gauze Friction Test)

A change in glossiness was evaluated by adding friction to the obtained evaluation sample 1 using the friction tester (manufactured by Yasuda Seiki Seisakusho, Ltd., product name: crock meter (friction tester I type)), as follows.

First, two sheets of general medical device medical gauze type I that is 100% cotton gauze were stacked and fixed to the frictional element of the friction tester. The two evaluation samples were arranged side by side on the friction tester so that one side was in close contact with each other. The load of the frictional element was 8.83N (900 gf), the diameter of the frictional element was 16 mm, the friction distance was 100 mm, the friction speed was 60 times/min.

As friction resistance, the case in which the retention rate of glossiness after friction (glossiness after friction/glossiness before friction×100) is 90% or more is designated as "○", the case in which the retention rate is 70% or more and less than 90% is designated as "Δ", and the case in which the retention rate is less than 70% is designated as "x".

The number of times of friction was set to 90 in the case of the molding method 1 and set to 200 in the case of the molding method 2.

(Bleed-Out Test)

The obtained evaluation sample 1 was placed in a thermo-hygrostat chamber at 60° C. and 95% RH, and the presence or absence of bleed out after 60 hours was visually evaluated. The case in which bleed out is not observed is designated as "○", the case in which bleed out is observed but is small (uniformly whitened color) is designated as "Δ", and the case in which bleed out is frequently observed (a granular aggregate is generated in a mottled state) is designated as "x".

(Bending Test)

Using the obtained evaluation sample 2, a bending test was performed in accordance with JIS K7171.

(Impact Test)

Using the obtained evaluation sample 2, an impact test was performed in accordance with JIS K7111-1, and notched Charpy impact strength was evaluated.

Regarding results of evaluating mechanical properties, the case in which bending strength is 45 MPa or more and impact strength is 9 kJ/m$^2$ or more is designated as "⊚", and the case in which bending strength is 45 MPa or more and impact strength is 5 kJ/m$^2$ or more and less than 9 kJ/m$^2$ is designated as "○".

TABLE 1

| | Type of Lubricant | Composition ratio (parts by mass) | | | | Friction resistance | Bleed-out resistance | Brightness (SCE) | Glossiness (20°) |
| | | Cellulose derivative | PBS resin | Acidic carbon black | Lubricant | | | | |
| --- | --- | --- | --- | --- | --- | --- | --- | --- | --- |
| Example 1 | Calcium | 78.4 | 19.6 | 1 | 1 | ○ | ○ | 1.9 | 79 |
| Example 2 | stearate | 77.2 | 19.3 | 1 | 2.5 | ○ | ○ | 1.6 | 80 |
| Example 3 | Zinc | 78.4 | 19.6 | 1 | 1 | Δ | ○ | 2.4 | 79 |
| Example 4 | stearate | 77.2 | 19.3 | 1 | 2.5 | Δ | ○ | 2.3 | 79 |
| Example 5 | Magnesium | 78.4 | 19.6 | 1 | 1 | ○ | ○ | 2.5 | 79 |
| Example 6 | stearate | 77.2 | 19.3 | 1 | 2.5 | ○ | ○ | 2.2 | 80 |
| Example 7 | Aluminum | 78.4 | 19.6 | 1 | 1 | Δ | ○ | 2.4 | 80 |
| Example 8 | monostearate | 77.2 | 19.3 | 1 | 2.5 | Δ | ○ | 1.9 | 79 |
| Example 9 | Aluminum | 78.4 | 19.6 | 1 | 1 | Δ | ○ | 2.3 | 79 |
| Example 10 | distearate | 77.2 | 19.3 | 1 | 2.5 | Δ | ○ | 2.0 | 79 |
| Example 11 | Aluminum | 78.4 | 19.6 | 1 | 1 | Δ | ○ | 2.3 | 80 |

TABLE 1-continued

| | Type of Lubricant | Composition ratio (parts by mass) | | | | Friction resistance | Bleed-out resistance | Brightness (SCE) | Glossiness (20°) |
|---|---|---|---|---|---|---|---|---|---|
| | | Cellulose derivative | PBS resin | Acidic carbon black | Lubricant | | | | |
| Example 12 | tristearate | 77.2 | 19.3 | 1 | 2.5 | Δ | ○ | 2.3 | 79 |
| Example 13 | Zinc | 78.4 | 19.6 | 1 | 1 | Δ | ○ | 2.5 | 79 |
| Example 14 | laurate | 77.2 | 19.3 | 1 | 2.5 | Δ | ○ | 1.9 | 79 |
| Example 15 | Ethylene | 78.4 | 19.6 | 1 | 1 | ○ | ○ | 2.1 | 79 |
| Example 16 | bis stearamide | 77.2 | 19.3 | 1 | 2.5 | ○ | ○ | 2.9 | 79 |
| Example 17 | Bis stearyl urea | 77.2 | 19.3 | 1 | 2.5 | ○ | ○ | 4.9 | 80 |
| Example 18 | Silicone-based lubricant | 77.2 | 19.3 | 1 | 2.5 | ○ | ○ | 3.2 | 79 |
| Comparative Example 1 | no lubricant | 79.2 | 19.8 | 1 | 0 | x | ○ | 2.0 | 79 |
| Example 19 | Glycerin monostearate | 78.4 | 19.6 | 1 | 1 | Δ | Δ | 1.9 | 79 |
| Example 20 | Stearamide | 78.4 | 19.6 | 1 | 1 | ○ | Δ | 2.0 | 79 |

TABLE 2

| | Type of Lubricant | Composition ratio (parts by mass) | | | | Friction resistance | Bleed-out resistance | Brightness (SCE) | Glossiness (20°) |
|---|---|---|---|---|---|---|---|---|---|
| | | Cellulose derivative | Adipic acid ester plasticizer | Acidic carbon black | Lubricant | | | | |
| Example 21 | Calcium | 91.5 | 5.0 | 1 | 2.5 | ○ | ○ | 1.5 | 75 |
| Example 22 | stearate | 93.9 | 5.0 | 0.1 | 1 | ○ | ○ | 1.4 | 78 |
| Example 23 | | 94.0 | 5.0 | 0 | 1 | ○ | ○ | — | 79 |
| Example 24 | | 89.0 | 7.5 | 1 | 2.5 | ○ | ○ | 1.6 | 79 |
| Example 25 | | 91.4 | 7.5 | 0.1 | 1 | ○ | ○ | 1.5 | 80 |
| Example 26 | | 91.5 | 7.5 | 0 | 1 | ○ | ○ | — | 79 |
| Example 27 | | 86.5 | 10.0 | 1 | 2.5 | ○ | ○ | 1.6 | 76 |
| Example 28 | | 84.0 | 10.0 | 1 | 5 | ○ | ○ | 2.0 | 76 |
| Example 29 | | 88.9 | 10.0 | 0.1 | 1.0 | ○ | ○ | 1.3 | 78 |
| Example 30 | | 89.0 | 10.0 | 0 | 1 | ○ | ○ | — | 79 |
| Example 31 | | 87.4 | 10.0 | 0.1 | 2.5 | ○ | ○ | 1.3 | 78 |
| Comparative Example 2 | no lubricant | 89.0 | 10.0 | 1 | 0 | x | ○ | 1.8 | 78 |

TABLE 3

| | Type of Lubricant | Composition ratio (parts by mass) | | | | Friction resistance | Bleed-out resistance | Brightness (SCE) | Glossiness (20°) |
|---|---|---|---|---|---|---|---|---|---|
| | | Cellulose derivative | PBS resin | Acidic carbon black | Lubricant | | | | |
| Example 1 | Calcium | 78.4 | 19.6 | 1 | 1 | ○ | ○ | 1.9 | 79 |
| Example 32 | stearate | 79.1 | 19.8 | 0.1 | 1 | ○ | ○ | 1.4 | 79 |
| Example 33 | | 79.2 | 19.8 | 0 | 1 | ○ | ○ | — | 80 |
| Example 2 | | 77.2 | 19.3 | 1 | 2.5 | ○ | ○ | 1.6 | 80 |
| Example 34 | | 88.2 | 9.8 | 1 | 1 | ○ | ○ | 1.7 | 79 |
| Example 35 | | 89.0 | 9.9 | 0.1 | 1 | ○ | ○ | 1.4 | 80 |
| Example 36 | | 89.1 | 9.9 | 0 | 1 | ○ | ○ | — | 79 |
| Example 37 | | 86.9 | 9.7 | 1 | 2.5 | ○ | ○ | 1.7 | 79 |
| Example 38 | | 83.3 | 14.7 | 1 | 1 | ○ | ○ | 1.6 | 79 |
| Example 39 | | 84.1 | 14.8 | 0.1 | 1 | ○ | ○ | 1.3 | 79 |
| Example 40 | | 84.1 | 14.9 | 0 | 1 | ○ | ○ | — | 80 |
| Example 41 | | 82.0 | 14.5 | 1 | 2.5 | ○ | ○ | 1.4 | 77 |
| Example 42 | | 86.2 | 12.3 | 1 | 0.5 | Δ | ○ | 1.7 | 78 |
| Example 43 | | 85.7 | 12.3 | 1 | 1 | ○ | ○ | 1.4 | 79 |
| Example 44 | | 84.4 | 12.1 | 1 | 2.5 | ○ | ○ | 1.4 | 76 |
| Example 45 | | 82.3 | 11.8 | 1 | 5.0 | ○ | ○ | 1.3 | 77 |

TABLE 3-continued

| | | Composition ratio (parts by mass) | | | | | | | |
|---|---|---|---|---|---|---|---|---|---|
| | Type of Lubricant | Cellulose derivative | PBS resin | Acidic carbon black | Lubricant | Friction resistance | Bleed-out resistance | Brightness (SCE) | Glossiness (20°) |
| Example 46 | | 91.5 | 7.4 | 0.1 | 1 | ○ | ○ | 1.5 | 79 |
| Example 47 | | 89.3 | 7.2 | 1 | 2.5 | ○ | ○ | 1.7 | 79 |
| Comparative Example 1 | no lubricant | 79.2 | 19.8 | 1 | 0 | x | ○ | 2.0 | 79 |

TABLE 4

| | | Composition ratio (parts by mass) | | | | | | |
|---|---|---|---|---|---|---|---|---|
| | Type of Colorant | Cellulose derivative | Adipic acid ester plasticizer | Colorant | Calcium stearate | Friction resistance | Bleed-out resistance | Glossiness (20°) |
| Example 48 | Carbon black 1 (acidic) | 93.0 | 5.0 | 1 | 1 | ○ | ○ | 79 |
| Example 49 | Carbon black 2 (neutral) | 93.0 | 5.0 | 1 | 1 | ○ | ○ | 79 |
| Example 50 | Red Iron Oxide 1 | 93.0 | 5.0 | 1 | 1 | Δ | ○ | 79 |
| Example 51 | Red Iron Oxide 2 | 93.0 | 5.0 | 1 | 1 | Δ | ○ | 78 |
| Example 52 | Chromium (III) oxide | 93.0 | 5.0 | 1 | 1 | ○ | ○ | 79 |
| Comparative Example 2 | Carbon black 1 (acidic) (no lubricant) | 89.0 | 10.0 | 1 | 0 | x | ○ | 79 |

TABLE 5

| | | Composition ratio (parts by mass) | | | | | | |
|---|---|---|---|---|---|---|---|---|
| | Type of Colorant | Cellulose derivative | PBS resin | Colorant | Calcium stearate | Friction resistance | Bleed-out resistance | Glossiness (20°) |
| Example 1 | Carbon black 1 (acidic) | 78.4 | 19.6 | 1 | 1 | ○ | ○ | 79 |
| Example 53 | Carbon black 2 (neutral) | 78.4 | 19.6 | 1 | 1 | ○ | ○ | 79 |
| Example 54 | Red Iron Oxide 1 | 78.4 | 19.6 | 1 | 1 | Δ | ○ | 80 |
| Example 55 | Red Iron Oxide 2 | 78.4 | 19.6 | 1 | 1 | Δ | ○ | 79 |
| Example 56 | Chromium (III) oxide | 78.4 | 19.6 | 1 | 1 | ○ | ○ | 79 |
| Comparative Example 1 | Carbon black 1 (acidic) (no lubricant) | 79.2 | 19.8 | 1 | 0 | x | ○ | 79 |

TABLE 6

| | Type of Plasticizing component | Composition ratio (parts by mass) | | | | | | | | |
|---|---|---|---|---|---|---|---|---|---|---|
| | | Cellulose derivative | Plasticizing component | Carbon black 1 | Calcium stearate | Friction resistance | Bleed-out resistance | Brightness (SCE) | Glossiness (20°) | Mechanical property |
| Example 57 | Adipic acid ester plasticizer | 93.0 | 5.0 | 1 | 1 | ○ | ○ | 1.7 | 79 | ○ |
| Example 58 | | 88.0 | 10.0 | 1 | 1 | ○ | ○ | 1.4 | 80 | ◎ |
| Example 59 | PBS resin | 91.5 | 7.4 | 1 | 1 | ○ | ○ | 1.6 | 78 | ○ |
| Example 60 | | 83.3 | 14.7 | 1 | 1 | ○ | ○ | 1.6 | 79 | ◎ |
| Example 61 | | 78.4 | 19.6 | 1 | 1 | ○ | ○ | 1.7 | 79 | ◎ |

From Tables 1, 2, and 3, it can be seen that the molded bodies obtained by using the resin compositions of the examples has good friction resistance and bleed-out resistance without greatly impairing the appearance (brightness and glossiness) as compared with the comparative examples. From Tables 4 and 5, it can be seen that the molded bodies obtained by using the resin compositions of the examples has good friction resistance and bleed-out resistance without greatly impairing the appearance (glossiness) as compared with the comparative example.

From Table 1, it can be seen that the fatty acid metal salt is preferable as the lubricant from the viewpoints of friction resistance, bleed-out resistance, and appearance (in particular, brightness). For example, Examples 1 and 2 using calcium stearate as a lubricant and Examples 5 and 6 using magnesium stearate are excellent in friction resistance and bleed-out resistance as compared with Example 19 (the lubricant is glycerin monostearate), and are excellent in bleed-out resistance with respect to Example 20 (the lubricant is stearamide). Also, it can be seen that, among the fatty acid metal salts, calcium stearate is preferable. For example, Examples 1 and 2 using calcium stearate have excellent friction resistance as compared with the examples (Examples 3 to 4, 7 to 12, and 13 to 14) using zinc stearate, aluminum stearate, and zinc laurate. In addition, it can be seen that, when calcium stearate is used, the brightness is low and the jet-blackness is excellent. For example, Examples 1 and 2 using calcium stearate have low brightness and excellent appearance as compared with Examples 5 to 6 using magnesium stearate, Examples 15 to 16 using fatty acid amide lubricant, Example 17 using aliphatic urea lubricant, and Example 18 using silicone-based lubricant.

The evaluation results shown in Tables 1 to 3 are the evaluation results of the molded bodies molded by the molding method 1, and for the compositions of Example 17 and Comparative Example 1, molded bodies were further produced by the molding method 2, and the evaluation thereof was carried out. Specifically, the same composition as in Example 17 was molded by the molding method 2 to produce a molded body A, and the same composition as in Comparative Example 1 was molded by the molding method 2 to produce a molded body B, and they were evaluated; and as the results, the molded body A containing the lubricant had excellent friction resistance as compared with the molded body B containing no lubricant. In addition, the brightness of the molded body A was 4.9, the glossiness was 80, the evaluation of bleed-out resistance was ○, the brightness of the molded body B was 2.0, the glossiness was 79, and the evaluation of bleed-out resistance was ○.

From Table 6, it can be seen that the molded bodies obtained by using the resin compositions of the examples have good friction resistance and bleed-out resistance without greatly impairing the appearance (brightness and glossiness), and further has good mechanical properties (bending strength and impact strength). In particular, Examples 58, 60 and 61 were superior to Examples 57 and 59 in terms of impact strength. Further, in Examples 58 and 60, deformation of the evaluation sample after the bleed-out test at high humidity was not observed, and the examples were superior to Example 61 in terms of moisture resistance, in which slight deformation was observed.

Having thus described the present invention with reference to the exemplary embodiments and Examples, the present invention is not limited to the above-described exemplary embodiments and Examples. Various modifications understandable to those skilled in the art may be made to the constitution and details of the present invention within the scope thereof.

Some or the whole of the above exemplary embodiments can be described also as the following exemplary embodiments, but is not limited to the following.

Further Exemplary Embodiment 1

A cellulose resin composition comprising a cellulose derivative (A) and a lubricant (B),
wherein the cellulose derivative (A) is an acylated cellulose obtained by substituting at least a part of hydrogen atoms of hydroxy groups of a cellulose with an acyl group having 2 to 4 carbon atoms, and
the content of the lubricant (B) is in the range of 0.1 to 10% by mass.

Further Exemplary Embodiment 2

The cellulose resin composition according to further exemplary embodiment 1, wherein the lubricant (B) is at least one selected from the group consisting of a fatty acid metal salt, a fatty acid amide lubricant, an aliphatic urea compound, a silicone-based lubricant, and a fatty acid ester lubricant.

Further Exemplary Embodiment 3

The cellulose resin composition according to further exemplary embodiment 2, wherein the lubricant (B) is at least one selected from the group consisting of a fatty acid metal salt, a fatty acid amide lubricant, an aliphatic urea compound, and a fatty acid ester lubricant, the melting point of the lubricant (B) is in the range of 100 to 200° C. or has a molecular weight of at least 500.

Further Exemplary Embodiment 4

The cellulose resin composition according to further exemplary embodiment 3, wherein the lubricant (B) is a fatty acid metal salt.

Further Exemplary Embodiment 5

The cellulose resin composition according to further exemplary embodiment 1, wherein the lubricant (B) is at least one selected from the group consisting of calcium stearate, ethylene bis stearamide, bis stearyl urea, and a silicone-based lubricant.

Further Exemplary Embodiment 6

The cellulose resin composition according to further exemplary embodiment 1, wherein the lubricant (B) is at least one selected from the group consisting of calcium stearate, zinc stearate, magnesium stearate, aluminum monostearate, aluminum distearate, aluminum tristearate, and zinc laurate.

Further Exemplary Embodiment 7

The cellulose resin composition according to further exemplary embodiment 1, wherein the lubricant (B) is ethylene bis stearamide.

Further Exemplary Embodiment 8

The cellulose resin composition according to further exemplary embodiment 1, wherein the lubricant (B) is bis stearyl urea.

Further Exemplary Embodiment 9

The cellulose resin composition according to further exemplary embodiment 1, wherein the lubricant (B) is a silicone-based lubricant.

Further Exemplary Embodiment 10

The cellulose resin composition according to further exemplary embodiment 1, wherein the lubricant (B) is a silicone-based syndicate including silica.

Further Exemplary Embodiment 11

The cellulose resin composition according to any one of further exemplary embodiments 1 to 10, further comprising a plasticizing component (C).

Further Exemplary Embodiment 12

The cellulose resin composition according to further exemplary embodiment 11, wherein the plasticizing component (C) is at least one of a polyester plasticizer and an adipic acid ester plasticizer.

Further Exemplary Embodiment 13

The cellulose resin composition according to further exemplary embodiment 11, wherein the plasticizing component (C) is at least one of an aliphatic polyester and an aliphatic adipic acid ester.

Further Exemplary Embodiment 14

The cellulose resin composition according to further exemplary embodiment 11, wherein the plasticizing component (C) is polybutylene succinate or bis(2-ethylhexyl) adipate.

Further Exemplary Embodiment 15

The cellulose resin composition according to any one of further exemplary embodiments 11 to 14, wherein the content of the plasticizing component (C) is in the range of 0.1 to 100 parts by mass with respect to 100 parts by mass of the cellulose derivative (A).

Further Exemplary Embodiment 16

The cellulose resin composition according to any one of further exemplary embodiments 1 to 15, further comprising a colorant.

Further Exemplary Embodiment 17

The cellulose resin composition according to further exemplary embodiment 16, wherein the colorant is a black colorant.

Further Exemplary Embodiment 18

The cellulose resin composition according to further exemplary embodiment 17, wherein the black colorant is a carbon black.

Further Exemplary Embodiment 19

The cellulose resin composition according to any one of further exemplary embodiments 16 to 18, wherein the content of the colorant is in the range of 0.01 to 10% by mass.

Further Exemplary Embodiment 20

The cellulose resin composition according to further exemplary embodiment 1,
wherein the lubricant (B) is calcium stearate, and
the cellulose resin composition further comprises an aliphatic polyester or an aliphatic adipic acid ester as the plasticizing component (C), and a carbon black as a black colorant.

Further Exemplary Embodiment 21

The cellulose resin composition according to any one of further exemplary embodiments 1 to 20, wherein the cellulose derivative (A) is an acylated cellulose obtained by substituting at least a part of hydrogen atoms of hydroxy groups of a cellulose with a propionyl group.

Further Exemplary Embodiment 22

The cellulose resin composition according to any one of further exemplary embodiments 1 to 20, wherein the cellulose derivative (A) is an acylated cellulose obtained by substituting at least a part of hydrogen atoms of hydroxy groups of a cellulose with an acetyl group and a propionyl group.

Further Exemplary Embodiment 23

A molded body formed by using the cellulose resin composition described in any one of further exemplary embodiments 1 to 22.

Further Exemplary Embodiment 24

A product using the molded body described in further exemplary embodiment 23.

The invention claimed is:

1. A cellulose resin composition, comprising:
a cellulose derivative (A),
a lubricant (B), and
a plasticizing component (C),
wherein the cellulose derivative (A) is an acylated cellulose obtained by substituting at least a part of hydrogen atoms of hydroxy groups of a cellulose with an acyl group having 2 to 4 carbon atoms, and remaining hydrogen atoms of the hydroxy groups of the cellulose are unsubstituted,
a content of the lubricant (B) is in a range of 0.1 to 10% by mass,
the plasticizing component (C) comprises an aliphatic polyester, and
a content of the aliphatic polyester is in a range of 7 to 30 parts by mass with respect to 100 parts by mass of the cellulose derivative (A).

2. The cellulose resin composition according to claim 1, wherein the lubricant (B) is at least one selected from the group consisting of a fatty acid metal salt, a fatty acid amide lubricant, an aliphatic urea compound, a silicone-based lubricant, and a fatty acid ester lubricant.

3. The cellulose resin composition according to claim 1, wherein the lubricant (B) is at least one fatty acid metal salt selected from the group consisting of calcium stearate, zinc stearate, magnesium stearate, aluminum monostearate, aluminum distearate, aluminum tristearate, and zinc laurate.

4. The cellulose resin composition according to claim 3, wherein the fatty acid metal salt is calcium stearate.

5. The cellulose resin composition according to claim 1, further comprising a colorant.

6. The cellulose resin composition according to claim 5, wherein the colorant comprises a carbon black, and a content of the carbon black is in a range of 0.05 to 5% by mass.

7. The cellulose resin composition according to claim 5, wherein the colorant comprises a carbon black, and a content of the carbon black is in a range of 0.05 to 0.3% by mass.

8. A molded body comprising the cellulose resin composition according to claim 1.

9. A product comprising the molded body according to claim 8.

10. The cellulose resin composition according to claim 1, wherein the lubricant (B) comprises a fatty acid metal salt, and a content of the fatty acid metal salt is in a range of 0.5 to 6% by mass.

11. The cellulose resin composition according to claim 1, wherein the aliphatic polyester is polybutylene succinate.

12. The cellulose resin composition according to claim 1, wherein in the cellulose derivative (A), a degree of substitution of the acyl group is 2.0 or more.

13. The cellulose resin composition according to claim 1, wherein the cellulose derivative (A) has at least propionyl group as the acyl group, and a degree of substitution of the propionyl group is 2.0 or more.

14. The cellulose resin composition according to claim 1, wherein the total amount of the cellulose derivative (A), the lubricant (B), and the plasticizing component (C) is in a range of 90 to 100% by mass with respect to the entire cellulose resin composition.

15. The cellulose resin composition according to claim 1, wherein the cellulose derivative (A) comprises acetyl group and propionyl group as the acyl group,
a degree of substitution of acetyl group is in a range of 0.05 to 0.5, and
a degree of substitution of propionyl group is in a range of 2.0 to 2.9.

16. The cellulose resin composition according to claim 1, wherein the cellulose derivative (A) is a cellulose acetate propionate.

17. The cellulose resin composition according to claim 1, wherein the cellulose derivative (A) is a cellulose acetate propionate,
a degree of substitution of acetyl group is in a range of 0.05 to 0.5, and
a degree of substitution of propionyl group is in a range of 2.0 to 2.9.

18. The cellulose resin composition according to claim 1, wherein the aliphatic polyester has a weight average molecular weight of 110,000 in terms of standard polystyrene.

19. The cellulose resin composition according to claim 1, wherein the hydroxy group remaining degree is 0.01 or more.

20. The cellulose resin composition according to claim 1, wherein the hydroxy group remaining degree is 0.1 or more.

21. A cellulose resin composition, comprising:
a cellulose derivative (A),
a lubricant (B), and
a plasticizing component (C),
wherein the cellulose derivative (A) is an acylated cellulose obtained by substituting at least a part of hydrogen atoms of hydroxy groups of a cellulose with an acyl group having 2 to 4 carbon atoms and remaining hydrogen atoms of the hydroxy groups of the cellulose are unsubstituted,
a content of the lubricant (B) is in a range of 0.1 to 10% by mass,
the plasticizing component (C) comprises an aliphatic adipic acid ester,
a content of the aliphatic adipic acid ester is in a range of 5.0 parts by mass with respect to 94.0 parts by mass of the cellulose derivative (A) to 15 parts by mass with respect to 100 parts by mass of the cellulose derivative (A).

22. The cellulose resin composition according to claim 21, wherein the total amount of the cellulose derivative (A), the lubricant (B), and the plasticizing component (C) is in a range of 90 to 100% by mass with respect to the entire cellulose resin composition.

23. The cellulose resin composition according to claim 21, wherein all resin component contained in the cellulose resin composition consists of the cellulose derivative (A).

24. The cellulose resin composition according to claim 21, wherein a content ratio of the aliphatic adipic acid ester is at least 7.5 parts by mass with respect to 91.5 parts by mass of the cellulose derivative (A).

25. The cellulose resin composition according to claim 21, wherein a content ratio of the aliphatic adipic acid ester is at least 10.0 parts by mass with respect to 89.0 parts by mass of the cellulose derivative (A).

26. The cellulose resin composition according to claim 21, wherein the lubricant (B) is at least one selected from the group consisting of a fatty acid metal salt, a fatty acid amide lubricant, an aliphatic urea compound, a silicone-based lubricant, and a fatty acid ester lubricant.

27. The cellulose resin composition according to claim 21, wherein the lubricant (B) is at least one fatty acid metal salt selected from the group consisting of calcium stearate, zinc stearate, magnesium stearate, aluminum monostearate, aluminum distearate, aluminum tristearate, and zinc laurate.

28. The cellulose resin composition according to claim 27, wherein the fatty acid metal salt is calcium stearate.

29. The cellulose resin composition according to claim 21, wherein the lubricant (B) comprises a fatty acid metal salt, and a content of the fatty acid metal salt is in a range of 0.5 to 6% by mass.

30. The cellulose resin composition according to claim 21, wherein in the cellulose derivative (A), a degree of substitution of the acyl group is 2.0 or more.

31. The cellulose resin composition according to claim 21, wherein the cellulose derivative (A) has at least propionyl group as the acyl group, and a degree of substitution of the propionyl group is 2.0 or more.

32. The cellulose resin composition according to claim 21, further comprising a colorant.

33. The cellulose resin composition according to claim 32, wherein the colorant comprises a carbon black, and a content of the carbon black is in a range of 0.05 to 5% by mass.

34. The cellulose resin composition according to claim 32, wherein the colorant comprises a carbon black, and a content of the carbon black is in a range of 0.05 to 0.3% by mass.

35. A molded body comprising the cellulose resin composition according to claim 15.

36. A product comprising the molded body according to claim 34.

37. The cellulose resin composition according to claim 21, wherein the cellulose derivative (A) comprises acetyl group and propionyl group as the acyl group,
a degree of substitution of acetyl group is in a range of 0.05 to 0.5, and
a degree of substitution of propionyl group is in a range of 2.0 to 2.9.

38. The cellulose resin composition according to claim 21, wherein the cellulose derivative (A) is a cellulose acetate propionate.

39. The cellulose resin composition according to claim 21, wherein the cellulose derivative (A) is a cellulose acetate propionate,
a degree of substitution of acetyl group is in a range of 0.05 to 0.5, and a degree of substitution of propionyl group is in a range of 2.0 to 2.9.

40. The cellulose resin composition according to claim 21, wherein the hydroxy group remaining degree is 0.01 or more.

41. The cellulose resin composition according to claim 21, wherein the hydroxy group remaining degree is 0.1 or more.

* * * * *